United States Patent [19]

Odaka

[11] 4,357,630
[45] Nov. 2, 1982

[54] METHOD FOR DETECTING VERTICAL SYNCHRONIZING SIGNAL

[75] Inventor: Kentaro Odaka, Tokyo, Japan

[73] Assignee: Sony Corporation, Tokyo, Japan

[21] Appl. No.: 265,532

[22] Filed: May 20, 1981

[30] Foreign Application Priority Data

May 23, 1980 [JP] Japan ............................ 55-68529

[51] Int. Cl.³ ............................................. H04N 5/10
[52] U.S. Cl. ................................................... 358/154
[58] Field of Search .................. 358/154, 158; 328/139

[56] References Cited

U.S. PATENT DOCUMENTS 4,240,111 12/1980 Meise .................................. 358/154

Primary Examiner—John C. Martin
Attorney, Agent, or Firm—Hill, Van Santen, Steadman, Chiara & Simpson

[57] ABSTRACT

A vertical synchronizing signal detecting method is disclosed which comprises the steps of detecting a unit signal from a complex synchronizing signal including a vertical synchronizing signal formed of a predetermined number of continuous unit signals each having a predetermined waveform, counting a number of the unit signals, and producing a detecting signal having a predetermined timing relation to the vertical synchronizing signal when it is detected that the unit signals continuously arrive with the above predetermined number.

3 Claims, 3 Drawing Figures

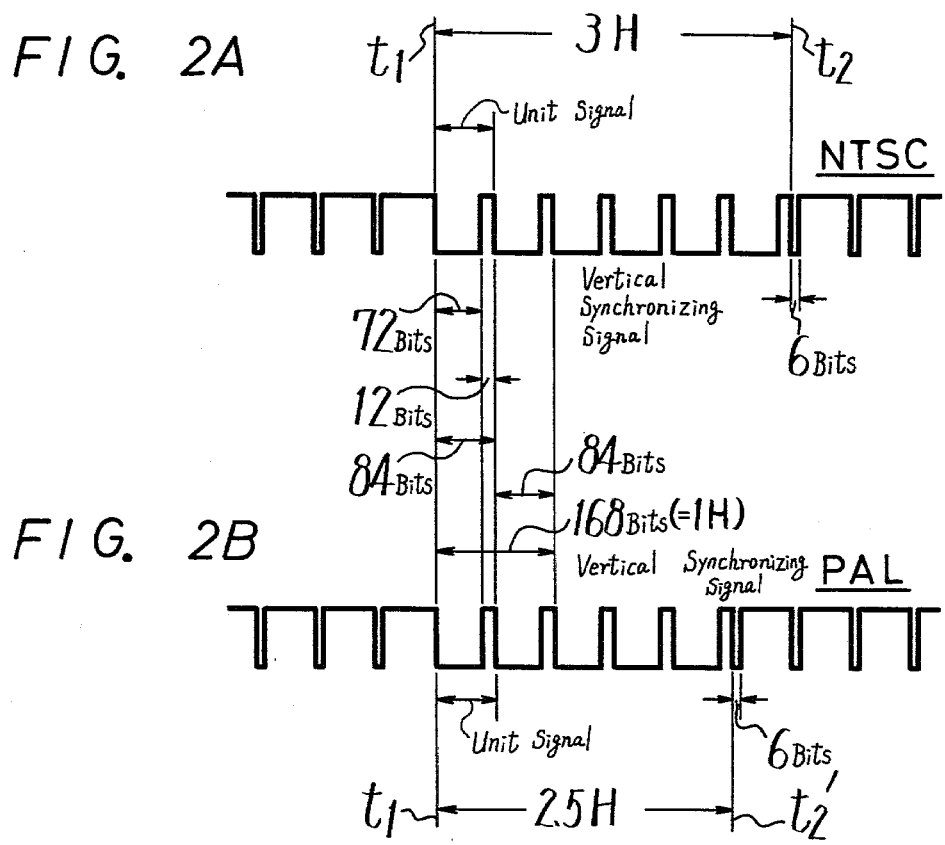
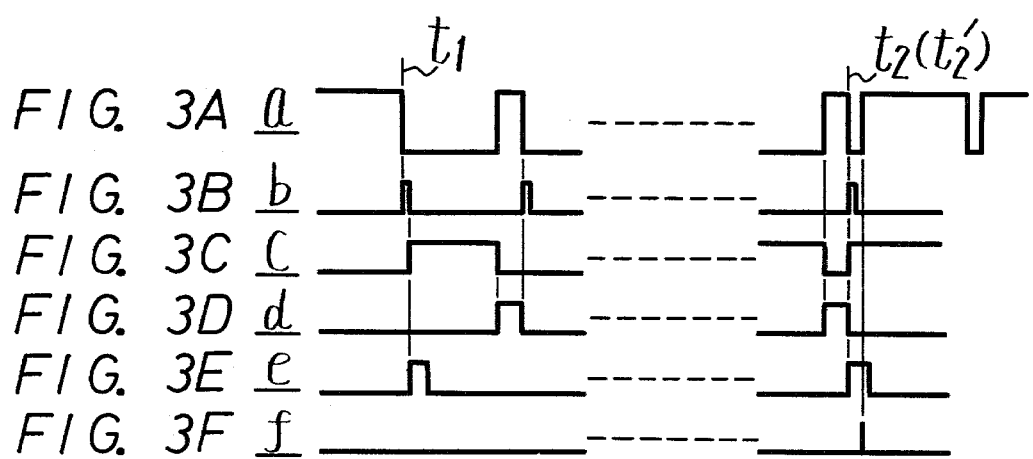

METHOD FOR DETECTING VERTICAL SYNCHRONIZING SIGNAL

BACKGROUND OF THE INVENTION

1. Field of the Invention

The present invention relates to a vertical synchronizing signal detecting method to accurately detect the vertical synchronizing signal from a complex synchronizing signal.

2. Description of the Prior Art

In the art, in order to detect a vertical synchronizing signal from a complex synchronizing signal included in, for example, a complex video signal or the like, the complex synchronizing signal is fed to an integrating circuit with a predetermined time constant which then separates at its output side only a vertical synchronizing signal having a large pulse width as an output wave with a large voltage value. If the vertical synchronizing signal is used under such a condition that it is not completely separated from the horizontal synchronizing signal, the interval between the vertical synchronizing signal and the horizontal synchronizing signal immediately before the vertical synchronizing signal is different between first and second fields, and hence the interlace scanning becomes in complete due to the influence of the horizontal synchronizing signal. Therefore, in general it is necessary that integrating circuits are provided at 2, 3 and so on stages to remove the horizontal synchronizing signal completely.

In the system in which a digital signal such as a PCM (pulse code modulation) signal of an audio signal or the like is transmitted on a television signal in place of an ordinary video signal, it is necessary that high accuracy is required in time and also the vertical synchronizing is not erroneously detected due to drop-out or the like. The above requirement can not be satisfied by the above integrating method.

With the employment of the above PCM signal transmission system, the signal processing system is changed over in accordance with the difference of the television system such as the NTSC system, PAL system and SECOM system used in respective countries. When the above system is provided on several or signal IC (integrated circuit), it is preferred that the system is automatically changed over in accordance with the television system. In such a case, the difference of the television system can be detected by the difference of the periods of the vertical synchronizing signals (the period is 3 H, H being the horizontal period, in the NTSC system and 2.5 H in the PAL system), but in the case of the above integrating method, the above detection may be erroneously carried out due to the drop-out or the like and also the generation of jitters caused by the use of the integrating circuit proposes further problems.

OBJECTS AND SUMMARY OF THE INVENTION

Accordingly, an object of the present invention is to provide a novel vertical synchronizing signal detecting method.

Another object of the invention is to provide a vertical synchronizing signal detecting method by which the vertical synchronizing signal can be accurately detected from a complex synchronizing signal.

According to an aspect of the present invention there is proposed a vertical synchronizing signal detecting method comprising the steps of:

detecting a unit signal from a complex synchronizing signal including a vertical synchronizing signal formed of a predetermined number of continuous unit signals each having a predetermined waveform; counting a number of said unit signals; and producing a detecting signal having a predetermined timing relation to said vertical synchronizing signal when it is detected that said unit signals continuously arrive with the above predetermined number.

The additional, and other objects, features and advantages of the present invention will be apparent from the following description taken in conjunction with the accompanying drawings.

BRIEF DESCRIPTION OF THE DRAWINGS

FIGS. 2A and 2B are waveform diagrams respectively showing complex vertical synchronizing signals of the NTSC and PAL system; and FIGS. 3A to 3F are respectively waveform diagrams used to explain the operation of the apparatus shown in FIG. 1.

DESCRIPTION OF THE PREFERRED EMBODIMENT

Figure 1:
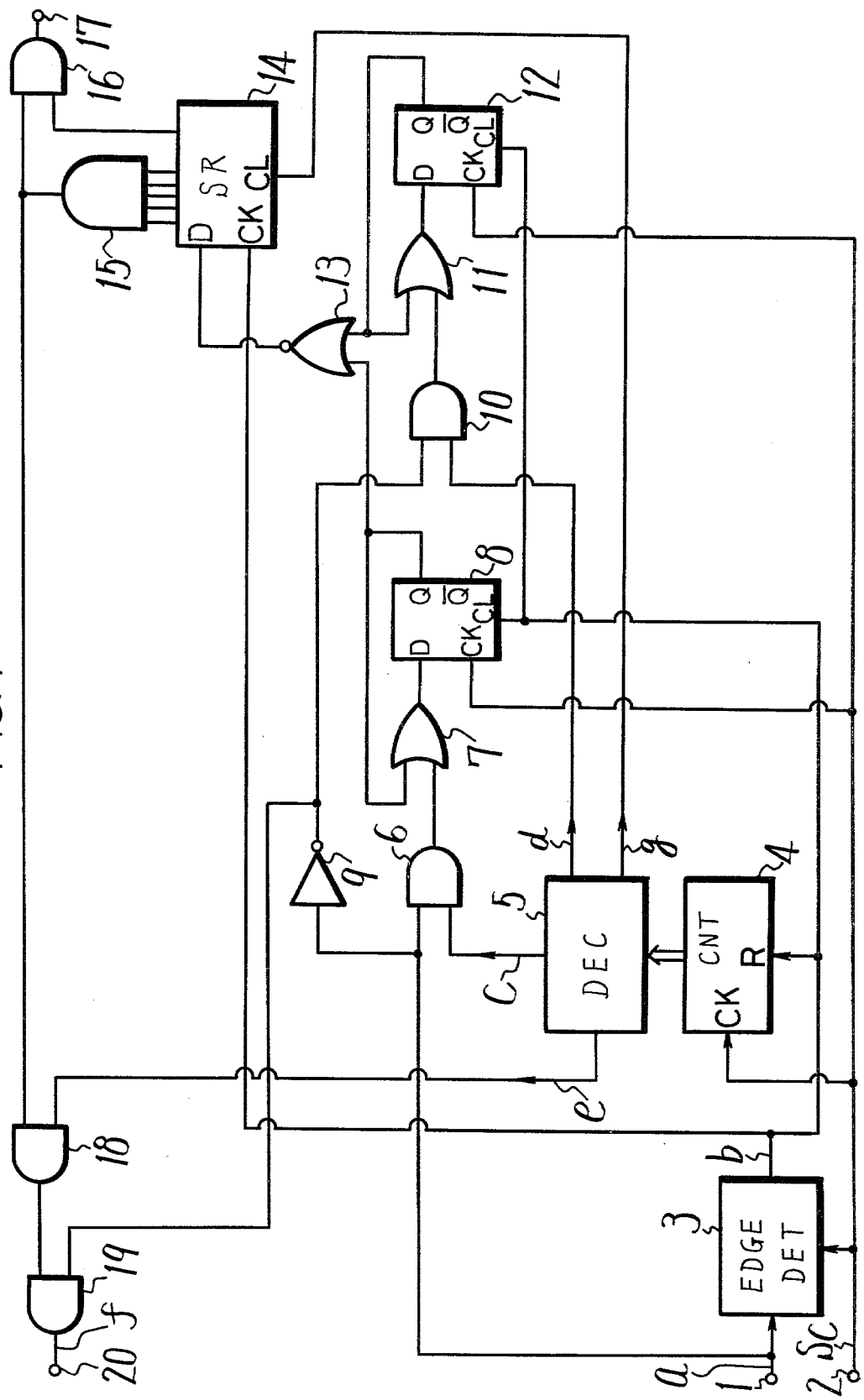
FIG. 1 is a block diagram showing an example of the apparatus which carries out an example of the vertical synchronizing signal detecting method according to the present invention.

The present invention will be hereinbelow described with reference to the attached drawings.

FIG. 1 shows an example of a vertical synchronizing signal detecting apparatus which carries out the vertical synchronizing signal detecting method of the present invention. In this case, the vertical synchronizing signal is detected from a complex synchronizing signal included in a composite PCM (pulse code modulation) signal, which consists of a PCM signal as a main signal (in this case, the PCM signal is that of an audio signal but a PCM signal of a video signal or other information signals may be used) and the complex synchronizing signal.

The example shown in FIG. 1 can also discriminate whether the vertical synchronizing signal belongs to the NTSC or PAL system.

Before describing the circuit construction shown in FIG. 1, the respective vertical synchronizing signals of the NTSC and PAL systems will be now described with reference to FIGS. 2A and 2B. The vertical synchronizing signal of the NTSC system exists in a time period of 3 H (H is the horizontal period) between times $t_1$ and $t_2$, while that of the PAL system exists in a time period of 2.5 H between times $t_1$ and $t_2'$. In this case, each of the vertical synchronizing signals consists of a pulse train each having the pulse width of 0.08 H and the period of 0.5 H. The equalizing pulses before and after the vertical synchronizing signal each consist of a pulse train each having the pulse width of 0.04 H and the period of 0.5 H.

One H is 63.5 $\mu$sec (miro seconds) in the case of the NTSC system and 64 $\mu$sec in the case of the PAL system, respectively, so that both vertical synchronizing signals may be taken as same.

Since the apparatus of FIG. 1 digitally processes the vertical synchronizing signal, 1 H is corresponded to 168 bits in either of the NTSC and PAL systems. Therefore, the pulse width of the vertical synchronizing signal corresponds to 12 bits, its period to 84 bits and its pulse interval to 72 bits, respectively. Thus, the pulse width of the equalizing pulse becomes 6 bits. The signal in the period (0.5 H) between the falling-down edges of the adjacent pulses of the vertical synchronizing signal will be hereinafter referred to as a unit signal. Therefore, the continuous unit signals which form the vertical synchronizing signal becomes six in the case of the NTSC system and five in the case of the PAL system different from the former.

Turning back to FIG. 1 the apparatus will be now described with reference to FIG. 3. In FIG. 1, reference numeral 1 designates an input terminal to which a complex synchronizing signal a shown in FIG. 3A of the NTSC system or PAL system, is supplied and 2 a input terminal to which a bit clock pulse Sc of 2.64 MHz (168 times of the horizontal frequency) is applied, respectively. The complex synchronizing signal a and the clock pulse Sc are both fed to an edge detecting circuit 3 which then produces a reset pulse b corresponding to the falling-down edge of the synchronizing signal a as shown in FIG. 3B. A counter 4, which may be a counter more than 84-scale, counts the clock pulse Sc applied thereto and is reset at every time when it receives the reset pulse b. The counted content of the counter 4 is supplied to a decoder 5 and decoded thereby. That is, the decoder 5 produces decoded pulses c, d, e, and g. The pulse c becomes "1" during the period from 0's bit to 72nd bit as shown in FIG. 3C, the pulse d becomes "1" during the period from 73rd bit to 84th bit as shown in FIG. 3D, the pulse e becomes "1" during the period from 0's bit to 8th bit as shown in FIG. 3E, and the pulse g becomes "1" at 85th bit which is not shown in FIG. 3.

The synchronizing signal a and the pulse c are both fed to an AND circuit 6. The output from the AND circuit 6 is supplied through an OR circuit 7 to a D-input terminal of a D-type flip-flop circuit 8. The non-inverted output at a Q-output terminal of the flip-flop circuit 8 is fed back to its D-input terminal through the OR circuit 7. The flip-flop circuit 8 has a clock input terminal CK supplied with the clock pulse Sc and a clear input terminal CL supplied with the reset pulse b. When the rising-up edge of the synchronizing signal a exists during the period where the pulse c is "1", the non-inverted output of the flip-flop circuit 8 becomes "1" which is held until the reset pulse b is applied thereto.

The synchronizing signal a is also fed to an inverter 9 to be inverted. The inverted synchronizing signal therefrom and the pulse d from the decoder 5 are both applied to an AND circuit 10 whose output is supplied through an OR circuit 11 to a D-input terminal of a D-type flip-flop circuit 12. A non-inverted output at an output terminal Q of the flip-flop circuit 12 is fed back through the OR circuit 11 to the D-input terminal of the flip-flop circuit 12. This flip-flop circuit 12 has a clock input terminal CK supplied with the clock pulse Sc and a clear input terminal CL supplied with the reset pulse b. If the falling-down edge of the synchronizing signal a exists in the period where the pulse d is "1", the non-inverted output of the flip-flop circuit 12 becomes "1" which is held until the reset pulse b is supplied thereto.

The non-inverted outputs from the flip-flop circuits 8 and 12 are both fed to a NOR circuit 13. This NOR circuit 13 delivers an output "1" at every time when the unit signal in the vertical synchronizing signals shown in FIGS. 2A and 2B arrives at the input terminal 1 and an output "0" at the times other than the above time. The output from the NOR circuit 13 is supplied to a shift register 14 of 6 bits at its D-input terminal. This shift register 14 has a clock input terminal CK supplied with the reset pulse b and a clear input terminal CL supplied with the pulse g. The shift register 14 is formed of six flip-flop circuits. In this case, the outputs from the first to fifth flip-flop circuits are all fed to an AND circuit 15, and the output from the sixth flip-flop circuit and the output from the AND circuit 15 are both fed to an AND circuit 16 from the output side of which an output terminal 17 for the system discriminating signal is led out. When the vertical synchronizing signal fed to the input terminal 1 is the signal of the NTSC system, six unit signals are counted. Therefore, the outputs from all the flip-flop circuits of the shift register 14 become "1" so that the output "1" is obtained at the output terminal 17. While, when the vertical synchronizing signal fed to the input terminal 1 is the signal of the PAL system, since five unit signals are counted, the outputs from the first to fifth flip-flop circuits become "1" but the output from the sixth flip-flop circuit is "0". Therefore, the output delivered to the output terminal 17 from the AND circuit 16 is "0". Thus, based upon the outputs delivered to the output terminal 17 it is discriminated whether the system of the vertical synchronizing signal applied to the input terminal 1 is the NTSC or PAL system.

It may be clear to those skilled in the art that the apparatus shown in FIG. 1 can be modified so as to discriminate more than three kinds of the vertical synchronizing signals in which the number of the continuous unit signals is different.

The output from the AND circuit 15 and the pulse e from the decoder 5 are both fed to an AND circuit 18. The output e (window signal) from the AND circuit 18 and the output from the inverter 9 (i.e. phase inverted synchronizing signal) are both fed to an AND circuit 19. At an output terminal 20 led out from the output side of the AND circuit 19, obtained is a detecting signal f (shown in FIG. 3F) for the vertical synchronizing signal. Although the detecting signal f corresponds to the first equalizing pulse coming after the period of the vertical synchronizing signal in this example as shown in FIG. 3, it may be of course possible that the detecting pulse f corresponds to the equalizing pulse after the first one. That is, it is only necessary that the detecting pulse f is such a signal (pulse) which has a predetermined timing relation to the vertical synchronizing signal in the complex synchronizing signal a.

According to the present invention described above, the vertical synchronizing signal can be accurately detected from the complex synchronizing signal.

Further, by the above example of the invention a plurality of different kinds of the vertical synchronizing signals, in which the numbers of the continuous unit signals are different, can be also discriminated.

In the case of the composite PCM signal, it is necessary that no erroneous detection of the vertical synchronizing signal is caused by the drop-out or the like. This request is satisfied by the present invention so that this invention is especially preferred to this case.

Now, if the probability for erroneously detecting the unit signal in the vertical synchronizing signal is taken as P, the probability for erroneously detecting whole the vertical synchronizing signals in the above case is $P^5$ or $P^6$ and hence the probability of the erroneous detection is lowered remarkably and accordingly the reliability in the detection of the vertical synchronizing signal becomes very high.

In the above example of the invention, since the detecting signal is provided by such a manner that the signal (pulse) having the predetermined timing relation to the vertical synchronizing signal in the complex synchronizing singal a is extracted by the window signal, even though the digital process the detecting signal is not affected by the jitter of the clock pulse. Thus, the detecting signal for the vertical synchronizing signal with the accurate timing can be provided.

Upon detecting the unit signal, in the above example of the invention, the "0" period of the unit signal is detected by the pulse c which is "1" during the period of 72 bits, but the "0" period of the unit signal could be detected by such a pulse which is "1" during the period of 70 to 74 bits, and the "1" period of the unit signal is detected by the pulse d which is "1" during the period of 12 bits in the above example of the invention but the "1" period of the unit signal could be detected by such a pulse which is "1" during the period of 10 to 14 bits.

It will be apparent that many modifications and variations could be effected by one skilled in the art without departing from the spirits or scope of the novel concepts of the present invention so that the spirits or scoe of the invention should be determined by the appended claims only.

I claim as my invention:

1. A vertical synchronizing signal detecting method comprising the steps of:
    detecting a unit signal from a complex synchronizing signal including a vertical synchronizing signal formed of a predetermined number of continuous unit signals each having a predetermined waveform;
    counting a number of said unit signals; and producing a detecting signal having a predetermined timing relation to said vertical synchronizing signal when it is detected that said unit signals continuously arrive with the above predetermined number.

2. A vertical synchronizing signal detecting method according to claim 1 further comprising the step of detecting the number of said continuous unit signals to thereby distinguishing between vertical synchronizing signals having different numbers of unit signals.

3. A vertical synchronizing signal detecting method as claimed in claim 1, wherein said complex synchronizing signal is contained in a composite PCM signal which includes a PCM signal as a main signal.

* * * * *